(12) United States Patent
Browne et al.

(10) Patent No.: US 11,887,491 B2
(45) Date of Patent: Jan. 30, 2024

(54) LANDING SITE CANDIDATE IDENTIFICATION

(71) Applicant: The Boeing Company, Chicago, IL (US)

(72) Inventors: Michael J. Browne, Hessen (DE); Andreas Godehart, Hessen (DE); Miriam Cornel, Bavaria (DE)

(73) Assignee: THE BOEING COMPANY, Arlington, VA (US)

( * ) Notice: Subject to any disclaimer, the term of this patent is extended or adjusted under 35 U.S.C. 154(b) by 319 days.

(21) Appl. No.: 16/841,894

(22) Filed: Apr. 7, 2020

(65) Prior Publication Data
US 2021/0312823 A1 Oct. 7, 2021

(51) Int. Cl.
*G06F 16/29* (2019.01)
*G08G 5/02* (2006.01)
*G05D 1/06* (2006.01)
*G06F 16/2457* (2019.01)
*G05D 1/10* (2006.01)

(52) U.S. Cl.
CPC .......... *G08G 5/025* (2013.01); *G05D 1/0676* (2013.01); *G05D 1/106* (2019.05); *G06F 16/24578* (2019.01); *G06F 16/29* (2019.01)

(58) Field of Classification Search
CPC ... G08G 5/025; G06F 16/24578; G06F 16/29; G05D 1/106; G05D 1/0676
See application file for complete search history.

(56) References Cited

U.S. PATENT DOCUMENTS

| 2011/0264312 | A1* | 10/2011 | Spinelli | G08G 5/0056 701/16 |
| 2014/0257603 | A1* | 9/2014 | McKeown | G08G 5/0021 701/16 |
| 2017/0320589 | A1* | 11/2017 | Moravek | G08G 5/0013 |

* cited by examiner

*Primary Examiner* — Vivek D Koppikar
*Assistant Examiner* — Jeffrey R Chalhoub
(74) *Attorney, Agent, or Firm* — MH2 Technology Law Group LLP

(57) ABSTRACT

A computer-implemented method includes: receiving, by a computing device, input data for identifying one or more landing site candidates for an aerial vehicle. The input data includes a set of criteria, terrain information, and obstacle information. The method further includes identifying, by the computing device, the one or more landing site candidates based on the input data and the criteria; providing, by the computing device, information regarding the identified one or more landing site candidates.

20 Claims, 5 Drawing Sheets

LANDING SITE CANDIDATE IDENTIFICATION

BACKGROUND

Landing sites for aerial vehicles (e.g., helicopters, remote controlled aerial vehicles, unmanned aerial vehicles, airplanes, or the like) may require certain features or attributes to ensure a safe landing. For example, a suitable landing site may need to have a certain amount of clearance, length, width, slope, etc. In some situations, a pilot may be unfamiliar with the area in which an aerial vehicle may need to be landed.

SUMMARY

In one example aspect, a computer-implemented method includes: receiving, by a computing device, input data for identifying one or more landing site candidates for an aerial vehicle. The input data includes a set of criteria, terrain information, and obstacle information. The method further includes identifying, by the computing device, the one or more landing site candidates based on the input data and the criteria; providing, by the computing device, information regarding the identified one or more landing site candidates.

In an example aspect, a computer program product includes a computer readable storage medium having program instructions embodied therewith. The program instructions are executable by a computing device to cause the computing device to perform operations including: receiving input data for identifying one or more landing site candidates for an aerial vehicle. The input data includes a set of criteria, terrain information, and obstacle information. The operations further include identifying the one or more landing site candidates based on the input data and the criteria; providing information regarding the identified one or more landing site candidates.

In an example aspect, a system includes: a processor, a computer readable memory, a non-transitory computer readable storage medium associated with a computing device, and program instructions executable by the computing device to cause the computing device to perform operations including: receiving input data for identifying one or more landing site candidates for an aerial vehicle. The input data includes a set of criteria, terrain information, and obstacle information. The operations further include identifying the one or more landing site candidates based on the input data and the criteria; providing information regarding the identified one or more landing site candidates.

DETAILED DESCRIPTION

Figure 1:
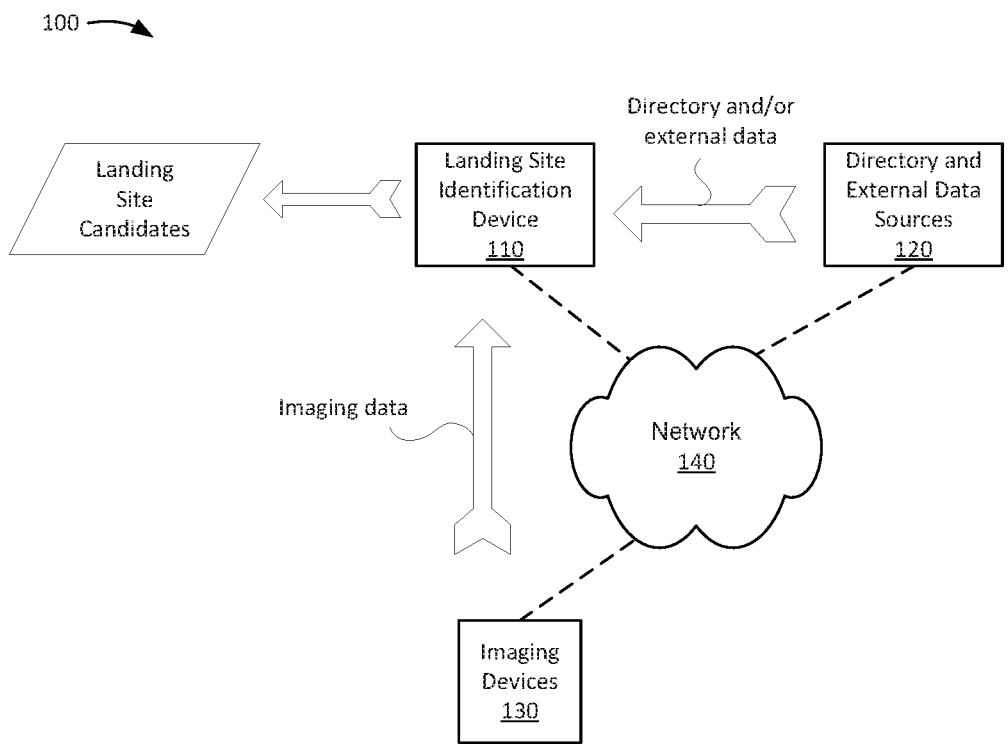
FIG. 1 illustrates an overview of an example implementation and environment in accordance with aspects of the present disclosure.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

In some situations, a pilot of an aerial vehicle (e.g., a helicopter, remote controlled aerial vehicle, an unmanned aerial vehicle, airplane, or the like) may be unfamiliar with the area in which the aerial vehicle may need to be landed. Thus, the pilot may not have knowledge of the most suitable landing site when the aerial vehicle may need to be landed. In the case of landing a helicopter along a vertical path, identification of a landing site may be especially problematic, as vertical landing sites may have precise landing site requirements as far as flatness of the terrain, mildness of wind conditions, etc. Accordingly, aspects of the present disclosure may include a system and/or method to identify one or more candidate landing sites suitable for landing any variety of aerial vehicles. As described herein, the candidate landing sites may be identified based on a variety of factors and criteria defining attributes of a suitable landing cite. Further, the candidate landing sites may be scored, ranked, and presented to a pilot (e.g., in real time for emergency or unexpected landings, or in advance of a flight as part of a flight plan).

In some embodiments, candidate landing sites may be determined based on aerial vehicle information (e.g., dimensions, weight, landing slope capabilities, rotary blade clearance, weather/wind tolerances, etc.), and/or weather data. Additionally, or alternatively, the candidate landing sites may be determined based on obstacle detection, terrain information/imaging data (e.g., acquired in real time and/or from terrain imaging services). Additionally, or alternatively, the candidate landing sites may be determined based on infrastructure data (e.g., proximity of a site to infrastructure such as roads) and/or mission data (e.g., infrastructure proximity requirements, time criticality information, fuel consumption criticality, and/or destination coordinates. In some embodiments, the candidate landing sites may also be determined based on pilot information (e.g., pilot experience, pilot landing preferences, pilot health/biometrics data, etc.). Additionally, or alternatively, the candidate landing sites may also be determined based on historical data including information of locations in which pilots have previously landed successfully, and/or information indicating difficulty or feasibility of a landing site location based on prior pilot feedback. In some embodiments, the historical data may include any variety of historical pilot feedback, such as landing site suitability or safety based on the pilot's previous observations/inspections, presence of obstacles (e.g., low hanging utility wires, etc.).

In some embodiments, weightings may be applied to the various aforementioned inputs in which the weightings may vary based on mission parameters, pilot information, etc. As an illustrative example, for one type of mission, fuel consumption may be considered to be less important than proximity to infrastructure (e.g., to a roadway). Thus, proximity to infrastructure may be weighed higher than fuel consumption. As described herein, any variety of criteria and weights may be applied for determining and scoring candidate landing sites. In this way, candidate landing sites may be provided to a pilot (e.g., in real time or in advance as part of a flight plan) in a situation in which the pilot may be unfamiliar with the vicinity in which landing is required. Also, candidate landing sites may be provided to a pilot even if the pilot is familiar with the vicinity, but in a situation in which alternate landing sites may be suggested based on the presence of obstacles, debris, and/or unusual or inclement wind/weather conditions. As such, landing safety, fuel consumption, landing time, and/or mission quality levels may be improved.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1 illustrates an overview of an example implementation and environment in accordance with aspects of the present disclosure. As shown in FIG. 1, environment 100 includes a landing site identification device 110, one or more directory and external data sources 120, one or more imaging devices 130, and a network 140.

The landing site identification device 110 may include one or more computing devices that that receives and processes information for determining landing site suggestions. In some embodiments, the landing site identification device 110 may receive any variety of data from the directory and external data source 120 and/or the imaging devices 130. Example data may include directory and/or external data (e.g., from the directory and external data sources 120). Additionally, or alternatively, the landing site identification device 110 may receive imaging data (e.g., from the imaging devices 130). Additionally, or alternatively, the landing site identification device 110 may receive other input data, such as mission data, aerial vehicle information, pilot data, etc. Additionally, or alternatively, the landing site identifications server 110 may receive historical data including information of locations in which pilots have previously landed successfully, and/or information indicating difficulty or feasibility of a landing site location based on prior pilot feedback. As described herein, the landing site identification device 110 may obtain or acquire input data relating to landing site candidates, identify one or more landing site candidates matching a set of criteria, score and rank the landing site candidates, and provide information regarding the landing site candidates (e.g., as a sorted list, within a map identifying the candidates, and/or in another format). In some embodiments, the landing site identification device 110 may be located within an aerial vehicle, or may interface with a display or computing device within the aerial vehicle in which a pilot may view the landing site candidates.

The directory and external data sources 120 may include one or more servers and/or computing devices providing any variety of external data that may be used by the landing site identification device 110 to identify candidate landing sites. In some embodiments, the external data may include weather data, terrain imaging data from an imaging service, infrastructure data (e.g., proximity of a site to infrastructure such as roads), pilot biometrics data, etc.

The imaging devices 130 may include one or more cameras, infrared image capture devices, laser imaging devices, satellites, etc. In some embodiments, the imaging devices 130 may be implemented within an aerial vehicle and may be used to provide real-time imaging data to the landing site identification device 110. In some embodiments, the imaging data may be used to model terrains and/or identify objects/obstacles in an area (e.g., an area where candidate landing sites may be present).

The network 140 may include network nodes and one or more wired and/or wireless networks. For example, the network 140 may include a cellular network (e.g., a second generation (2G) network, a third generation (3G) network, a fourth generation (4G) network, a fifth generation (1G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 140 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 140 may include copper transmission cables, optical transmission fibers, wireless transmission, routers, firewalls, switches, gateway computers and/or edge servers.

The quantity of devices and/or networks in the environment 100 is not limited to what is shown in FIG. 1. In practice, the environment 100 may include additional devices and/or networks; fewer devices and/or networks; different devices and/or networks; or differently arranged devices and/or networks than illustrated in FIG. 1. Also, in some implementations, one or more of the devices of the environment 100 may perform one or more functions described as being performed by another one or more of the devices of the environment 100. Devices of the environment 100 may interconnect via wired connections, wireless connections, or a combination of wired and wireless connections.

Figure 2:
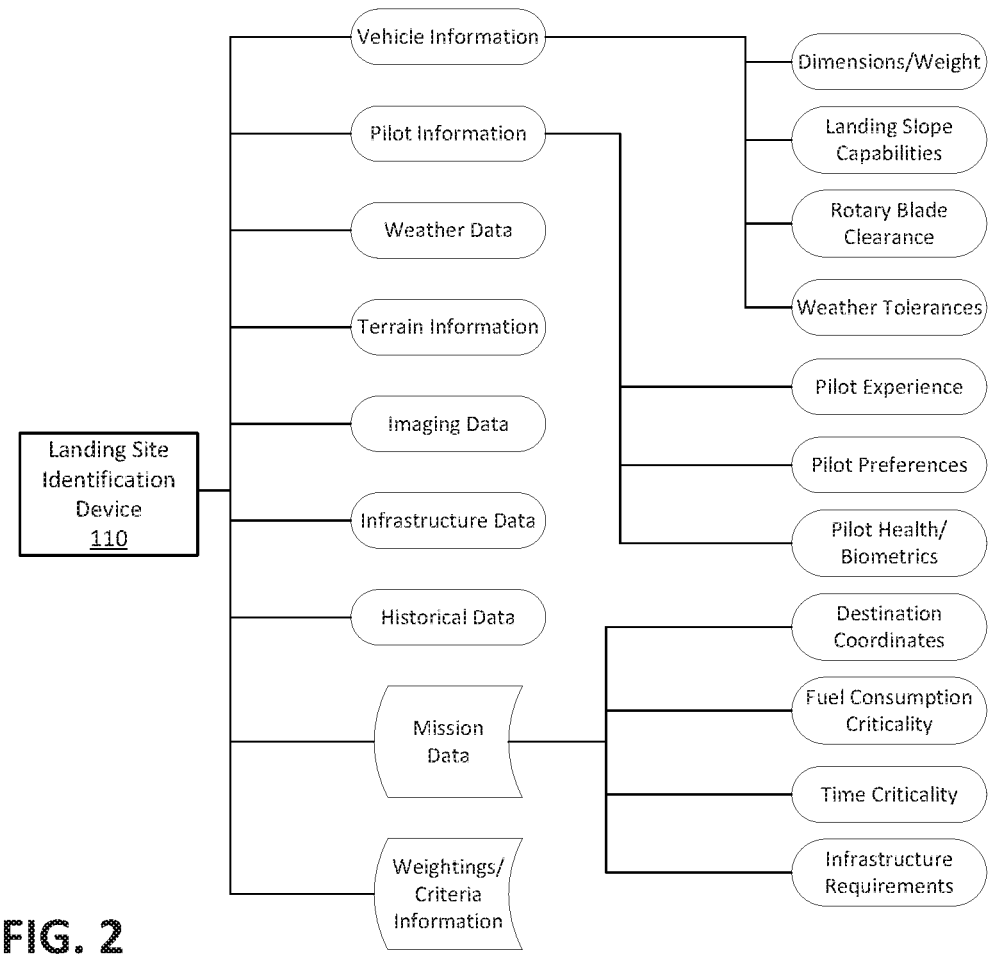
FIG. 2 illustrates example input data that a landing site identification device may receive as part of a process for determining and presenting candidate landing sites.

FIG. 2 illustrates example input data that the landing site identification device 110 may receive as part of a process for determining and presenting candidate landing sites. As shown in FIG. 2, the landing site identification device 110 may receive vehicle information (e.g., dimensions, weight, landing slope capabilities, rotary blade clearance, weather/wind tolerances, etc.), and/or weather data. Additionally, or alternatively, the landing site identification device 110 may receive terrain information/imaging data (e.g., acquired in real time and/or from terrain imaging services). Additionally, or alternatively, the landing site identification device 110 may receive infrastructure data (e.g., proximity of a site to infrastructure such as roads) and/or mission data (e.g., infrastructure proximity requirements, time criticality information, fuel consumption criticality, and/or destination coordinates. Additionally, or alternatively, the landing site identification device 110 may receive historical data including information of locations in which pilots have previously landed successfully, or information indicating difficulty or feasibility of a landing site location based on prior pilot feedback. In some embodiments, the historical data may include any variety of historical pilot feedback, such as landing site suitability or safety based on the pilot's previous observations/inspections, presence of obstacles (e.g., low hanging utility wires, etc.). In some embodiments, the landing site identification device 110 may receive pilot information (e.g., pilot experience, pilot landing preferences, pilot health/biometrics data, etc.). Further, the landing site identification device 110 may receive weightings and/or criterial information. In some embodiments, the weightings and/or criteria information may be based on the mission data (e.g., infrastructure proximity requirements, time criticality information, fuel consumption criticality, etc.). In general, the criteria information may identify the preferred or required attributes of a landing site, and the weightings information may identify the criticality of the input data.

In some embodiments, the landing site identification device 110 may receive any other variety of input data not shown in FIG. 2 or described herein. The input data may be received from the directory and external data sources 120, the imaging devices 130, and/or other source (e.g., user inputs, inputs from accessory devices such as biometrics monitoring devices, etc.). For example, the landing site identification device 110 may receive mission data via user input or from a data source, mission schedule, mission plan, etc. identifying mission requirements. As described herein, the input data may be used to identify, score, rank, and present candidate landing sites (e.g., in a real-time landing operation and/or in advance as part of a flight plan).

Figure 3:
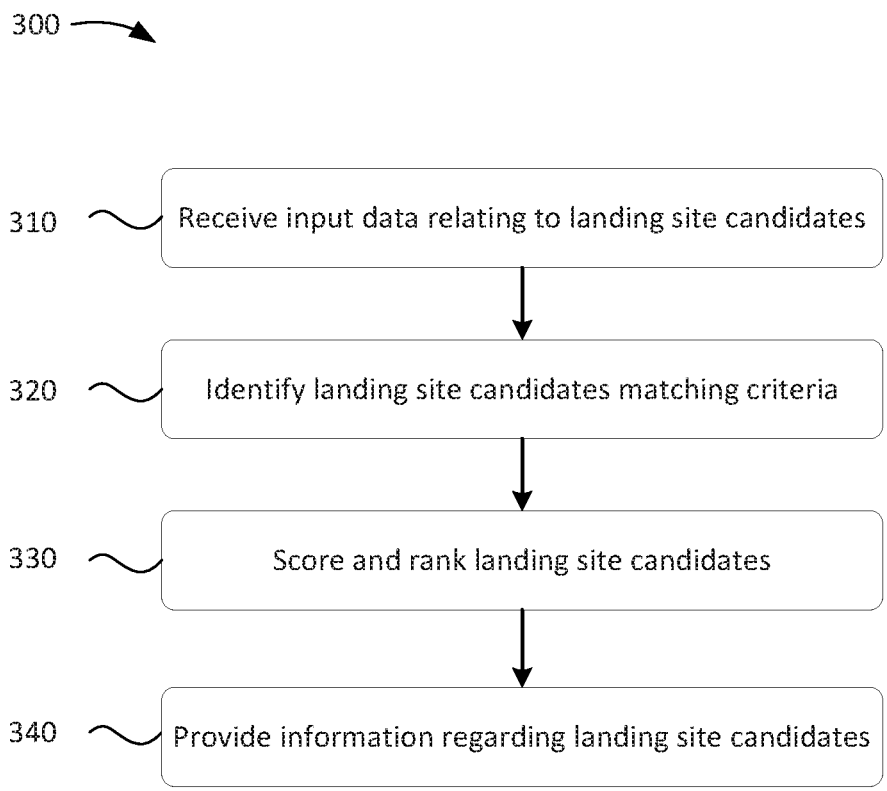
FIG. 3 illustrates an example flowchart of a process for identifying, scoring, ranking, and presenting landing site candidates (e.g., in real-time, or in advance).

FIG. 3 illustrates an example flowchart of a process for identifying, scoring, ranking, and presenting landing site candidates (e.g., in real-time, or in advance). The blocks of FIG. 3 may be implemented in the environment of FIG. 3, for example, and are described using reference numbers of elements depicted in FIG. 3. As noted above, the flowchart illustrates the architecture, functionality, and operation of possible implementations of systems, methods, and computer program products according to various embodiments of the present disclosure.

As shown in FIG. 3, process 300 may include receiving input data relating to landing candidates (block 310). For example, the landing site identification device 110 may receiving input data relating to landing site candidates, including landing site criteria and weightings information. Some examples of the input data that the landing site identification device 110 may acquire are described above with respect to FIG. 2. In some embodiments, the landing site identification device 110 may acquire the input data from any source, such as the directory and external data sources 120, the imaging devices 130, and/or other sources (e.g., user input, biometrics devices, mission data servers, etc.). As an example, a user (e.g., pilot, flight planner, etc.) may input or select the criteria for the candidate landing sites. Examples of candidate landing site criteria may include proximity to a location, proximity to infrastructure (e.g., roadway), estimated time to land, fuel consumption criteria, landing difficulty estimate, etc. In some embodiments, the landing site identification device 110 may derive one or more criteria based on input information, such as pilot experience, pilot health/biometrics data, weather conditions, etc. As an example, lower pilot experience may trigger a criteria that the landing site should have a relatively lower landing difficulty.

Process 300 also may include identifying landing site candidates matching criteria (block 320). For example, the landing site identification device 110 may identify landing site candidates matching the criteria (e.g., the criteria received as part of the input data). More specifically, the landing site identification device 110 may analyze the area of a landing site (e.g., as defined by the input data and/or criteria), and identify candidates in the area having one or more of the criteria. As an illustrative example, the landing site identification device 110 may analyze the area of a landing site (e.g., in real-time or in advance) and identify candidate landing sites in the area that satisfying criteria relating to, for example, size/area dimensions, landing slope, terrain flatness, clearance, proximity to infrastructure, proximity to a target location, landing difficulty level, etc. In some embodiments, a measure of landing difficulty may be determined based on terrain features, presence of obstacles, landing slope, etc.

Process 300 further may include scoring and ranking landing site candidates (block 330). For example, the landing site identification device 110 may score and rank the landing site candidates (e.g., identified at block 320). In some embodiments, the landing site identification device 110 may score and rank the landing site candidates based on the criteria and the weightings information. As one example, for scoring a landing site candidate, each attribute of the landing site candidate may be assigned a value, and the landing site identification device 110 may apply respective weights to each value. The values may be totaled to generate an aggregate score for the landing site. A similar technique may be used to generate aggregate scores for all landing site candidates. Additionally, or alternatively, any other variety of suitable scoring techniques may be used. The landing site candidates may then be ranked based on score.

As previously discussed, a candidate landing site may be scored based on landing difficulty, pilot experience and/or pilot health/biometrics. As an illustrative example, landing sites with lower landing difficulty may drive the candidate score higher, particularly for a pilot with relatively low level of experience. While lower landing difficulty sites may be generally preferred over higher landing difficulty sites, it is possible that a higher landing difficulty site may still be scored higher than a lower difficulty site in a situation in which a pilot's experience is of a relatively high level and when the higher difficulty landing site is scored higher in other areas (e.g., is closer in proximity to infrastructure or a target location, requires less landing time, etc.). Also, a pilot's current health or biometrics data may be considered in the scoring of candidate landing sites. For example, if based on biometrics data, a pilot was showing signs of fatigue, the landing difficulty may be weighed higher than if the pilot was not showing signs of fatigue. Also, scoring of the landing site candidates may constructively eliminate some of the landing sites as candidates (e.g., when the scores of these landing sites drops below threshold).

Process 300 also may include providing information regarding landing site candidates (block 340). For example, the landing site identification device 110 may provide information regarding the landing site candidates. In some embodiments, the landing site identification device 110 may output the information as an ordered list (e.g., in order of rank). Additionally, or alternatively, the landing site identification device 110 may output the information in a format that may be used to generate a digital map (e.g., in a computer-based mapping application). In some embodiments, the map may identify the locations of the candidate landing sites, along with their respective scores and/or rankings.

As described herein, the process 300 of FIG. 3 may be performed in advance of a flight (e.g., in which the landing site candidates may be included as part of a flight plan). Additionally, or alternatively, the process 300 of FIG. 3 may be performed in a real-time landing operation in which the landing site identification device 110 may obtain real-time imaging data (e.g., from the imaging devices 130) to identify the presence of obstacles, terrain features, etc. in order to identify and score landing site candidates. Also, the landing site identification device 110 may obtain real-time weather data for identifying and scoring landing site candidates based on the real-time weather data. Additionally, or alternatively, the landing site identification device 110 may obtain any other variety of data in order to provide landing site candidates with the most up-to-date scores.

Figure 4:
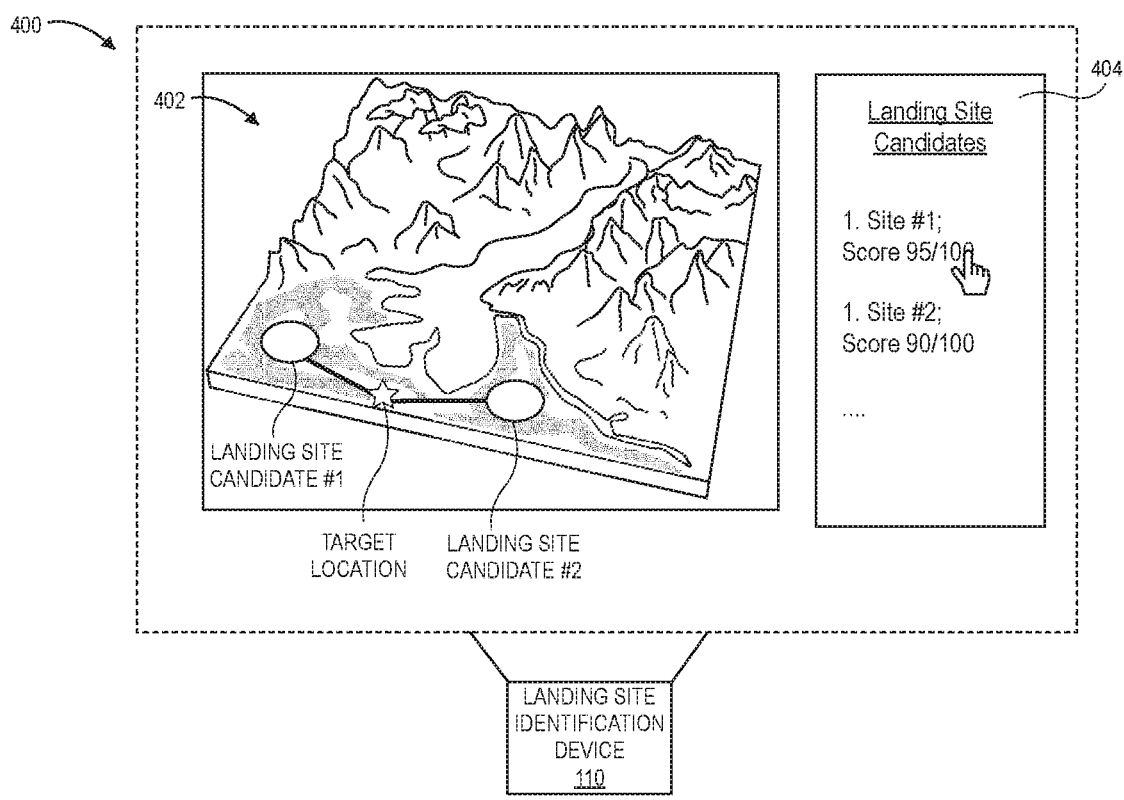
FIG. 4 illustrates an example interface for presenting landing site candidates in a geographical map described herein.

FIG. 4 illustrates an example interface for presenting landing site candidates in a geographical map described herein. In the example of FIG. 4, the landing site identification device 110 may present a map within a graphical user interface (e.g., the interface 400). As shown in FIG. 4, the interface 400 may present a map of an area 402, a target location, and candidate landing sites near the target location (e.g., candidate site #1, and candidate site #2). In some embodiments, the interface 400 may be based off of a pre-generated digital map having a visual representation of geological and/or terrain features. The interface 400 may further present a ranked list of the candidate sites (e.g., in a window 404). In some embodiments, the candidate sites may be user selectable. Upon selection of a candidate site, the interface 400 may present additional information regarding the selected candidate site (e.g., the attributes of the selected candidate site, such as landing area, coordinates, difficulty level, clearance, etc.). In some embodiments, the user may select a landing site candidate to receive navigation instructions and/or program an auto-pilot system based on the coordinates of the selected landing site. It is noted that that example of FIG. 4 is provided for illustrative purposes only, and in practice, the interface 400 may appear differently and may have a different format than that shown.

Figure 5:
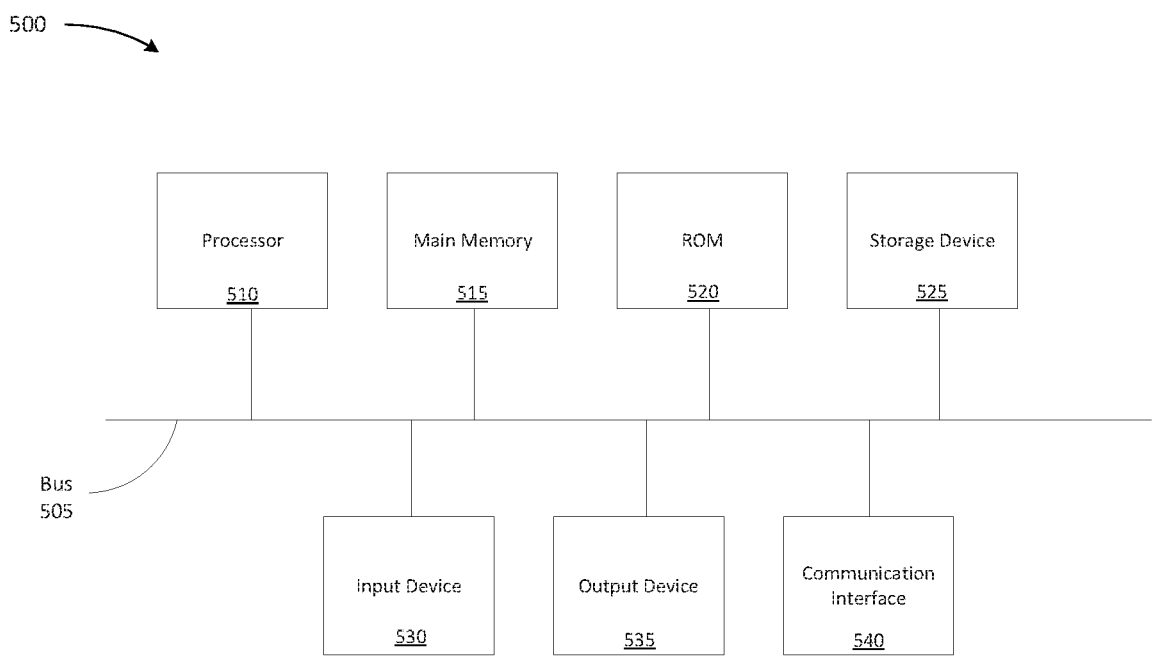
FIG. 5 illustrates example components of a device that may be used within environment of FIG. 1.

FIG. 5 illustrates example components of a device 500 that may be used within environment 100 of FIG. 1. Device 500 may correspond to the landing site identification device 110, the directory and external data sources 120, and/or the imaging devices 130. Each of the landing site identification device 110, the directory and external data sources 120, and/or the imaging devices 130 may include one or more devices 500 and/or one or more components of device 500.

As shown in FIG. 5, device 500 may include a bus 505, a processor 510, a main memory 515, a read only memory (ROM) 520, a storage device 525, an input device 530, an output device 535, and a communication interface 540.

Bus 505 may include a path that permits communication among the components of device 500. Processor 510 may include a processor, a microprocessor, an application specific integrated circuit (ASIC), a field programmable gate array (FPGA), or another type of processor that interprets and executes instructions. Main memory 515 may include a random access memory (RAM) or another type of dynamic storage device that stores information or instructions for execution by processor 510. ROM 520 may include a ROM device or another type of static storage device that stores static information or instructions for use by processor 510. Storage device 525 may include a magnetic storage medium, such as a hard disk drive, or a removable memory, such as a flash memory.

Input device 530 may include a component that permits an operator to input information to device 500, such as a control button, a keyboard, a keypad, or another type of input device. Output device 535 may include a component that outputs information to the operator, such as a light emitting diode (LED), a display, or another type of output device. Communication interface 540 may include any transceiver-like component that enables device 500 to communicate with other devices or networks. In some implementations, communication interface 540 may include a wireless interface, a wired interface, or a combination of a wireless interface and a wired interface. In embodiments, communication interface 540 may receiver computer readable program instructions from a network and may forward the computer readable program instructions for storage in a computer readable storage medium (e.g., storage device 525).

Device 500 may perform certain operations, as described in detail below. Device 500 may perform these operations in response to processor 510 executing software instructions contained in a computer-readable medium, such as main memory 515. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 515 from another computer-readable medium, such as storage device 525, or from another device via communication interface 540. The software instructions contained in main memory 515 may direct processor 510 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 500 may include additional components, fewer components, different components, or differently arranged components than are shown in FIG. 5.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
receiving, by a computing device, input data for identifying one or more landing site candidates along a vertical path for a vertical takeoff and landing aerial vehicle and an input data weight for each input data, wherein the input data includes historical pilot data for the one or more landing site candidates, terrain information acquired in real time, aerial vehicle information comprising rotary blade clearance and one or more of dimensions, weight, landing slope capabilities, weather tolerances, wind tolerances, and obstacle information acquired in real time and the input data weight is based on one or more mission parameters, one or more pilot information, or both the one or more mission parameters and the one or more pilot information;
identifying, by the computing device and in real time, the one or more landing site candidates based on the input data and the input data weight;
generating, by the computing device and onto a computer display in the vertical takeoff and landing aerial vehicle in real time, a digital map displaying information regarding the identified one or more landing site candidates;
providing the digital map to the computer display with the one or more landing site candidates that are identified;
receiving, from an operator of the vertical takeoff and landing aerial vehicle, a selection of a particular one of the identified one or more landing site candidates provided on the digital map;

providing additional information regarding the selection, wherein the additional information comprises landing area coordinates and one or more of: landing difficulty level or landing clearance information; and providing auto-pilot instructions based on the selection to land the vertical takeoff and landing aerial vehicle and the landing area coordinates.

2. The method of claim 1, further comprising:

providing additional information regarding the selected particular one of the identified one or more landing site candidates.

3. The method of claim 1, wherein the input data further comprises one or more of:
pilot information;
weather data;
imaging data;
infrastructure data;
historical data;
mission data;
weightings information;
pilot experience;
pilot preferences;
pilot health information; and
pilot biometrics information.

4. The method of claim 1, further comprising scoring the identified one or more landing site candidates.

5. The method of claim 4, further comprising ranking the identified one or more landing site candidates based on the scoring.

6. The method of claim 1, wherein the identifying the one or more landing sites comprises identifying the one or more landing during a real-time landing operation.

7. A computer program product comprising a non-transitory computer readable storage medium having program instructions embodied therewith, the program instructions being executable by a computing device to cause the computing device to perform operations comprising:

receiving input data for identifying one or more landing site candidates along a vertical path for a vertical takeoff and landing aerial vehicle and an input data weight for each input data, wherein the input data includes historical pilot data for the one or more landing site candidates, terrain information acquired in real time, aerial vehicle information comprising rotary blade clearance and one or more of dimensions, weight, landing slope capabilities, weather tolerances, wind tolerances, and obstacle information acquired in real time and the input data weight is based on one or more mission parameters, one or more pilot information, or both the one or more mission parameters and the one or more pilot information;

identifying, in real time, the one or more landing site candidates based on the input data and the input data weight;

generating, in real time, a digital map displaying information regarding the identified one or more landing site candidates;

providing the digital map to the computer display with the one or more landing site candidates that are identified;

receiving, from an operator of the vertical takeoff and landing aerial vehicle, a selection of a particular one of the identified one or more landing site candidates provided on the digital map;

providing additional information regarding the selection, wherein the additional information comprises landing area coordinates and one or more of: landing difficulty level or landing clearance information; and providing auto-pilot instructions based on the selection to land the vertical takeoff and landing aerial vehicle and the landing area coordinates.

8. The computer program product of claim 7, wherein the operations further comprise:

providing additional information regarding the selected particular one of the identified one or more landing site candidates.

9. The computer program product of claim 7, wherein the input data further comprises one or more of:
pilot information;
weather data;
imaging data;
terrain information
infrastructure data;
historical data;
mission data;
weightings information;
pilot experience;
pilot preferences;
pilot health information; and
pilot biometrics information.

10. The computer program product of claim 7, wherein the operations further comprise scoring the identified one or more landing site candidates.

11. The computer program product of claim 10, wherein the operations further comprise ranking the identified one or more landing site candidates based on the scoring.

12. A computer system comprising:

a processor, a computer readable memory, a non-transitory computer readable storage medium associated with a computing device, and program instructions executable by the computing device to cause the computing device to perform operations comprising:

receiving input data for identifying one or more landing site candidates along a vertical path for a vertical takeoff and landing aerial vehicle and an input data weight for each input data, wherein the input data includes historical pilot data for the one or more landing site candidates, terrain information acquired in real time, aerial vehicle information comprising rotary blade clearance and one or more of dimensions, weight, landing slope capabilities, weather tolerances, wind tolerances, and obstacle information acquired in real time and the input data weight is based on one or more mission parameters, one or more pilot information, or both the one or more mission parameters and the one or more pilot information;

identifying, in real time, the one or more landing site candidates based on the input data and the input data weight;

generating, onto a computer display in the vertical takeoff and landing aerial vehicle in real time, a digital map displaying information regarding the identified one or more landing site candidates;

providing the digital map to the computer display with the one or more landing site candidates that are identified;

receiving, from an operator of the vertical takeoff and landing aerial vehicle, a selection of a particular one of the identified one or more landing site candidates provided on the digital map;

providing additional information regarding the selection, wherein the additional information comprises landing area coordinates and one or more of: landing difficulty level or landing clearance information; and providing auto-pilot instructions based on the selection to land the vertical takeoff and landing aerial vehicle and the landing area coordinates.

13. The system of claim 12, wherein the operations further comprise:
providing additional information regarding the selected particular one of the identified one or more landing site candidates.

14. The system of claim 12, wherein the input data comprises one or more of:
pilot experience;
pilot preferences;
pilot health information; and
pilot biometrics information.

15. The system of claim 12, wherein the operations further comprise scoring and ranking the identified one or more landing site candidates.

16. The method of claim 1, wherein the historical pilot data comprises information from one or more pilots that have previously landed successfully, information indicating difficulty or feasibility of a landing site location based on prior pilot feedback, or both.

17. The computer program product of claim 7, wherein the historical pilot data comprises information from one or more pilots that have previously landed successfully, information indicating difficulty or feasibility of a landing site location based on prior pilot feedback, or both.

18. The system of claim 12, wherein the historical pilot data comprises information from one or more pilots that have previously landed successfully, information indicating difficulty or feasibility of a landing site location based on prior pilot feedback, or both.

19. The method of claim 3, wherein the mission data comprises infrastructure proximity requirements, time criticality information, fuel consumption information, or destination coordinates.

20. The computer program product of claim 9, wherein the mission data comprises infrastructure proximity requirements, time criticality information, fuel consumption information, or destination coordinates.

* * * * *